Patented Apr. 22, 1952

2,593,676

UNITED STATES PATENT OFFICE 2,593,676

SLUSHING COMPOSITIONS

Ernest R. Irwin, Hammond, Ind., assignor to Standard Oil Company, Chicago, Ill., a corporation of Indiana No Drawing. Application August 3, 1949, Serial No. 108,425

11 Claims. (Cl. 106—14)

This invention relates to improvements in metal protective coating compositions and more particularly relates to petroleum-containing corrosion and/or rust preventives or slushing compositions.

Metal surfaces whenever possible are protected from corrosion or rusting by a coating of some kind. In general, two types of protective coatings are employed, namely permanent and temporary coatings. In the former class are included oxide coatings, phosphate coatings, metallic coatings, such as zinc, cadmium, chromium, etc., paints, varnishes and other non-metallic materials which dry to a hard film. In the latter class of protective coatings, which are of the type, which are readily removed from the surfaces to which they are applied, are those prepared from oils, waxes, asphalts, etc.

It is an object of the present invention to provide an improved corrosion and/or rust preventive composition.

Another object of the invention is to provide corrosion and/or preventive compositions which have improved adherence to the metal surfaces and which do not tend to slip from such surfaces.

Other advantages and objects of the invention will become apparent from the following description thereof.

The improved corrosion and/or rust preventive compositions, hereinafter referred to as "slushing compositions" of the present invention, comprise the following principal ingredients in the following approximate proportions:

| | Per cent |
|---|---|
| Oil-soluble petroleum sulfonates | 5–15 |
| Petrolatum | 5–15 |
| Hydrocarbon oil | 65–85 |
| Pour point depressor | 0–2 |
| Petroleum resid | 0.5–5 |

The oil-soluble petroleum sulfonates used are soaps of sulfonic acids obtained by the treatment of petroleum oils with strong sulfuric acid, usually fuming sulfuric acid. In the treatment of the petroleum oils with strong sulfuric acid two layers are formed; an acid sludge layer and an oil layer; the latter containing the preferentially oil-soluble sulfonic acids. After separating the acid sludge, the oil-soluble sulfonic acids dissolved in the oil are removed by one of the many well known means. Because of their characteristic reddish-brown color, these oil-soluble sulfonic acids are commonly referred to as mahogany acids, and the soaps thereof as mahogany soaps. The oil-soluble sulfonic acids so obtained vary in molecular weight from about 350 to about 500. The soda soaps of the oil-soluble sulfonic acids having molecular weights within the range of from about 350 to about 450 while preferentially oil-soluble, are soluble in water to a certain extent. The soda soaps of the oil-soluble petroleum sulfonic acids having molecular weights above about 450, particularly above 470, are insoluble in water. While the soda soaps of the mahogany acids having molecular weights of about 350 to about 450 are preferentially oil-soluble but water-soluble to some extent, the polyvalent soaps of such acids are substantially insoluble in water. The mahogany soaps used in the present slushing composition are those which exhibit substantially zero solubility in water and complete solubility in hydrocarbon oils, such as petroleum oils. Accordingly, I prefer to use the polyvalent metal soaps of mahogany acids having molecular weights within the range of from about 350 to about 450, such as calcium, barium, strontium, lead, zinc, cobalt, magnesium, etc., soaps of such mahogany acids, or the alkali metal soaps, such as sodium, potassium or lithium, of mahogany acids having molecular weights above about 450, although the polyvalent metal soaps of such mahogany acids are also suitable. I can also use mixtures of polyvalent metal soaps of mahogany acids having molecular weights within the range of from about 350 to about 450 with the metal soaps of mahogany acids having molecular weights above about 450. For example, I may use a mixture of from about 1% to about 14% of a calcium soap of a mahogany acid having a molecular weight of about 425 with from about 1% to about 14% of a sodium soap of mahogany acids having molecular weights of about 470 to about 500, to make the total quantity of mahogany soaps amount to not more than about 15%.

The petrolatum used in the above formulation can be any suitable petrolatum having a melting point of from about 125° F. to about 145° F. The amount of petrolatum employed will depend on the film thickness desired of the final composition, the wax content of the petrolatum and the melting point of the petrolatum.

The hydrocarbon oil component of the composition can suitably be a petroleum oil having a S. S. U. viscosity of about 100 seconds to about 2000 seconds at 100° F. The viscosity of the oil can be varied according to the desired viscosity of the final product, and the amount of the mahogany soap and petrolatum used. The oil may be that from a single fraction cut or may be composed of a blend of oils of various viscosities which will give the viscosity desired. Likewise, the oils may be overhead distillates or residual oils. While natural petroleum oils are preferred, I can also use synthetic hydrocarbon oils of the desired viscosity characteristics.

Under some conditions it is desirable to add a pour point depressor to the slushing oil composition in order to lower the pour point thereof. Suitable pour point depressors are those prepared by the chemical condensation of naphthalene and a chlorinated wax with a Friedel-Crafts catalyst, such as described in U. S. Patents Nos. 1,963,917, 1,963,918, 2,030,307, 2,057,104 and 2,089,665 and 1,815,022, zinc or magnesium hydroxy stearates, condensation products of phenol and chlorinated wax in the presence of $AlCl_3$, followed by condensation with phthalyl chloride, as described in U. S. 2,048,465 and other well known pourpoint depressants.

The petroleum resid used is suitably a 10% to a 15% bottoms from crude oil distillation. Such resids may have a specific gravity at 60° F. of from about 0.98 to about 1.05 and a S. S. U. viscosity at 210° F. of from about 2000 seconds to about 10,000 seconds, or a furol viscosity at 210° F. of from about 200 seconds to about 1000 seconds. I have found that a petroleum resid particularly well suited is one obtained by distilling a sulfur-containing naphthenic crude petroleum oil to a 10 to 15% bottoms. The resultant resid has a Saybolt furol viscosity at 210° F. of from about 250 seconds to about 350 seconds and usually a sulfur content of from about 1.5% to about 3.0%. The presence of the petroleum resid in the slushing oil composition provides a more tenacious and homogeneous film on the metal surfaces to which the slushing compound is applied. In addition, the petroleum resid has a pour point depressing effect on the composition.

As an example of a specific slushing oil formulation which I have found very effective is the following:

3% sodium soap of a mahogany acid having a molecular weight of about 470 to 500;
7.0% calcium soap of a mahogany acid having a molecular weight of about 430 to 450;
12% petrolatum of about 135° F. melting point;
1% pour point depressor [1];
1% petroleum resid [2];
76% petroleum oil [3].

A slushing composition of the above formulation when subjected to a humidity cabinet test exhibited a "life" of 300 to 400 hours. In this humidity test, small steel panels, coated with the material to be tested, are suspended in a highly humid atmosphere, for example, 100% relative humidity at 100° F., in a special cabinet and the time of initial corrosion of the panels noted. The humidity cabinet is provided with heating units and thermal regulators for automatic temperature control. A water level of two inches or more is maintained in the bottom of the cabinet to assure high humidity at all times. The steel panels are coated by dipping into the rust preventive material and are suspended by glass hooks from a glass rod running across the top of the humidity cabinet. Generally from 1 to 1.5 complete changes of air per hour are provided in the cabinet. The minimum acceptable period of protection offered by the rust preventive material in the humidity cabinet test is determined in accordance with the severity of the contemplated serve conditions under which the rust preventive material will be applied.

A slushing composition having a Saybolt Universal viscosity at 100° F. of about 1000 seconds, containing 5% calcium soap of a mahogany acid having a molecular weight of about 430–450, and 12.5% petrolatum of about 135° F. melting point did not wet the metal test panels homogeneously and failed in 24 to 96 hours in the humidity cabinet test. When 10% of a sodium soap of a mahogany acid having a molecular weight of about 470–500 was added to this mixture complete wetting of the metal test panels were obtained but the film separated on storage in a vertical position at room temperature. This slippage factor was too great to meet commercial requirements.

The addition of a petroleum resid of the type above described corrected the slippage just described and resulted in a product which completely wetted and adhered tenaciously to the test panels. The presence of the petroleum resid in the slushing composition permits the coating of metal surfaces with thicker protective films without causing slippage or drainage of the film; this provides longer and more effective protection against corrosion and/or rusting.

Percentages given herein and in the appended claims are volume percentages, unless otherwise noted.

While the present invention has been illustrated by reference to specific examples thereof, the invention is not to be limited thereby, but includes within its scope such modifications as come within the spirt of the appended claims.

I claim:

1. A slushing composition consisting essentially of from about 5% to about 15% oil-soluble petroleum sulfonates, from about 5% to about 15% petrolatum, from about 0.5% to about 5% of a petroleum resid having a furol viscosity at 210° F. of from about 200 to about 1000 seconds, from 0% to about 2% of a pour point depressor obtained by the chemical condensation of a chlorinated paraffin wax and a naphthalene in the presence of a Friedel-Crafts catalyst, and from about 65% to about 85% hydrocarbon oil.

2. A slushing composition consisting essentially of the following ingredients in the following approximate proportions:

| | Percent |
|---|---|
| Metal soap of mahogany acids having molecular weights of about 470 to 500 | 1–14 |
| Polyvalent metal soap of mahogany acids having molecular weights of about 350 to 450 | 1–14 |
| Petrolatum | 5–15 |
| Petroleum resid | 0.5– 5 |
| Pour point depressor | 0– 2 |
| Hydrocarbon oil | 65–85 | the sum of the mahogany acid soaps amounting to from about 5% to about 15% of the total composition, said petroleum resid having a furol viscosity at 210° F. of from about 200 seconds to about 1000 seconds, and said pourpoint depressor being obtained by the chemical condensation of a chlorinated paraffin wax and a naphthalene in the presence of a Friedel-Crafts catalyst.

3. Composition of claim 2 wherein the metal soap of the mahogany acids having molecular weights of about 470 to 500 is an alkali metal soap.

---
[1] Condensation product of naphthalene and chlorinated paraffin wax in presence of $AlCl_3$.
[2] 10%–15% bottoms having a Saybolt furol viscosity at 210° F. of about 300 seconds from high sulfur naphthenic crude oil.
[3] Naphthenic distillate oil blend having a Saybolt Universal viscosity at 100° F. of about 970 seconds and a V. I. of about 50.

4. The composition of claim 2 wherein the soap of the mahogany acids having molecular weights of about 470 to about 500 is a sodium soap.

5. The composition of claim 2 wherein the metal soap of mahogany acids having molecular weights of about 470 to about 500 is an alkaline earth soap.

6. The composition of claim 2 wherein the metal soap of mahogany acids having molecular weights of about 470 to about 500 is a calcium soap.

7. The composition of claim 2 wherein the polyvalent metal soap of mahogany acids having molecular weights of about 350 to about 450 is an alkaline earth soap.

8. The composition of claim 2 wherein the polyvalent metal soap of mahogany soaps having molecular weights of about 350 to about 450 is a calcium soap.

9. The composition of claim 2 wherein the petroleum resid is a 10% to 15% bottoms of a high sulfur naphthenic crude oil, said resid having a Saybolt furol viscosity at 210° F., from about 200 seconds to about 1000 seconds.

10. A slushing composition consisting essentially of about 3% sodium soap of a mahogany acid having a molecular weight of about 470 to 500, about 7% of a calcium soap of a mahogany acid having a molecular weight of about 430 to about 450, about 12% of a petrolatum having a melting point of about 135° F., about 1% of a pour point depressor obtained by the chemical condensation of naphthalene and a chlorinated paraffin wax in the presence of AlCl₃, about 1% of a 10% to 15% petroleum resid having a Saybolt furol viscosity at 210° F. of 250-350 seconds, obtained from a high sulfur naphthenic crude oil and about 76% of a petroleum oil having a Saybolt Universal viscosity at 100° F. of about 970 seconds.

11. A slushing compsition consisting essentially of from about 5% to about 15% oil-soluble petroleum sulfonates, from about 5% to about 15% petrolatum, from about 0.5% to about 5% of a petroleum resid having a furol viscosity at 210° F. of from about 200 to about 1000 seconds, and from about 65% to about 85% of a hydrocarbon oil.

ERNEST R. IRWIN.

REFERENCES CITED

The following references are of record in the file of this patent:

UNITED STATES PATENTS

| Number | Name | Date |
| --- | --- | --- |
| 1,711,754 | Smith | May 7, 1929 |
| 2,119,553 | McLaren et al. | June 7, 1938 |
| 2,412,634 | Schwartz | Dec. 17, 1946 |